United States Patent [19]

Johnson

[11] Patent Number: 4,505,407

[45] Date of Patent: Mar. 19, 1985

[54] VOLUMETRIC MEASURE FOR GRANULAR MATERIAL

[75] Inventor: Timothy L. Johnson, Arcata, Calif.

[73] Assignee: Francis Tool Company, Eugene, Oreg.

[21] Appl. No.: 473,125

[22] Filed: Mar. 7, 1983

[51] Int. Cl.³ .............................................. B67D 5/06
[52] U.S. Cl. ...................... 222/181; 222/439; 222/440; 222/523; 222/525; 141/356
[58] Field of Search .............. 222/439, 438, 434, 425, 222/424.5, 448, 449, 181, 522, 523, 525, 513, 514, 524, 526, 531, 559, 362, 450, 451, 453, 435, 440, 464; 141/374, 353, 351, 356

[56] References Cited

U.S. PATENT DOCUMENTS

| 249,464 | 11/1881 | Farnham | 222/447 |
| 309,088 | 12/1884 | Perry | 222/439 |
| 346,718 | 8/1886 | Capewell | 222/139 |
| 425,659 | 4/1890 | Comstock . | |
| 466,209 | 12/1891 | Wiget | 222/139 |
| 793,416 | 6/1905 | Clapp | 222/525 |
| 922,085 | 5/1909 | Chamberlain | 222/439 |
| 1,445,339 | 2/1923 | Mathews | 222/453 X |
| 1,912,304 | 5/1933 | Phillips | 222/523 |
| 2,426,898 | 9/1947 | Paldani | 222/439 |
| 2,603,397 | 7/1952 | Olson | 222/438 X |
| 3,089,620 | 5/1963 | Green et al. | 222/440 X |

Primary Examiner—Joseph J. Rolla
Assistant Examiner—Louise Heim
Attorney, Agent, or Firm—James D. Givnan, Jr.

[57] ABSTRACT

A base supports a hopper for the storage of the particulate material to be dispensed in measured amounts. A stationary discharge tube in place in the base defines an opening for the entry of hopper stored material. A control tube is slidably mounted within the discharge tube and defines a second opening which upon control tube elevation registers with the discharge tube opening to admit material flow into the control tube. Said control tube carries, in a removable manner at its lower end, a measuring tube which is interchangeable with other measuring tubes, each of a different length, to enable dispensing of various amounts of material from a measuring chamber defined by the joined tubes. An O-ring couples the control tube and the measuring tube in a removable manner. The control tube additionally includes an insert or plug shaped member so as to prevent bridging and voids in the particulate measured.

8 Claims, 4 Drawing Figures

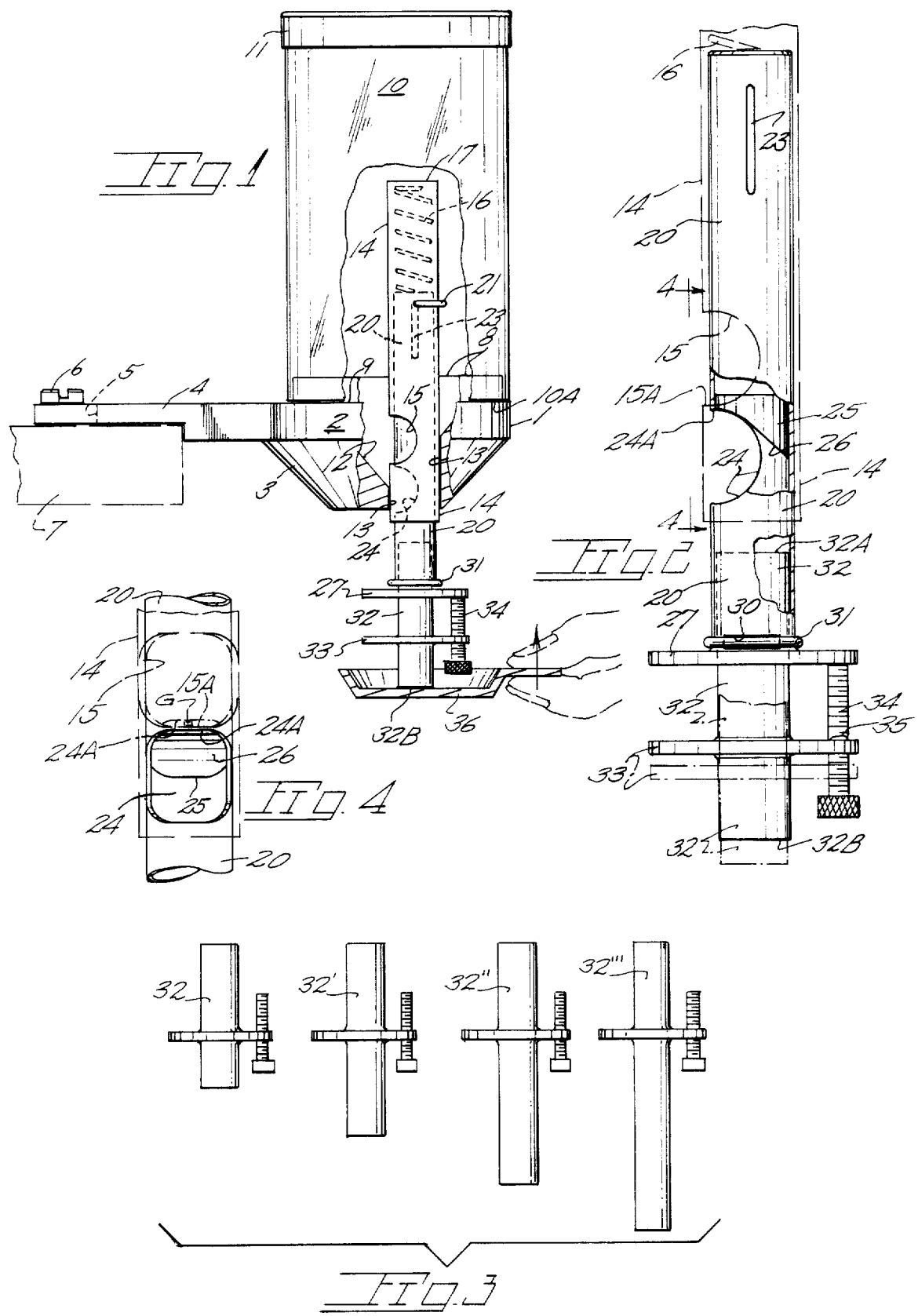

VOLUMETRIC MEASURE FOR GRANULAR MATERIAL

BACKGROUND OF THE INVENTION

The present invention pertains generally to devices, or as commonly termed measures, for discharging a predetermined quantity of granular material such as, for example, gunpowder.

The most common measure used by those engaged in reloading of rifle cases and shotgun shells are of the crank-operated type having a rotatable component, either fixed or replaceable, which defines a powder receiving cavity. Crank operation rotates the cavity from a load receiving to a load discharging position. A recognized disadvantage of such measures is the fact that the powder is subjected to a degree of grinding during drum rotation which may significantly affect later shell or cartridge performance. A further drawback to rotary measures is the vibration which occurs during the shearing of a gunpowder granule. While slight, such vibration has a settling effect on the gunpowder to affect the density of the measured charge and the hopper carried powder to be subsequently measured.

To vary the measured amount of typical crank-operated rotary devices, the cavity defined by the rotor must be altered which usually entails the replacement or altering of the rotor at some inconvenience to the user.

Additionally known in the art are dipper-type measures which are simply a receptacle of a known volume affixed to the end of a handle. A still further measuring technique includes the use of powder scales which technique is considered too time consuming and tedious by most individuals engaging in reloading.

With attention now to the closest known prior art, U.S. Pat. Nos. 249,464; 309,088; 346,718 and 466,209 disclose measures for gunpowder wherein an amount is measured by deposit into a chamber jointly defined by telescopically joined tubes with provision made for axial adjustment of same varying the measured amount. Upper and lower gates regulate the intake and discharge of the measured amount.

U.S. Pat. No. 425,659 discloses a bottle filling machine utilizing telescopically engaged tubes each having an offset opening from an opening in the remaining tube with the tubes biased to a closed position by a spring confined between the tube ends.

U.S. Pat. No. 2,426,898 discloses a gunpowder measure having a rotary valve which releases gunpowder into an area defined by a stationary tube closed by the upper ends of a pair of telescoped tubes which pair of tubes provides a valve at their corresponding upper ends opened and closed upon rotation of one of said tubes. Threaded means are provided to simultaneously raise or lower the telescoped tubes to alter the size of the measuring chamber. A set screw acts on the adjustment screw.

SUMMARY OF THE PRESENT INVENTION

The present invention is embodied within a device for precisely measuring a volume of granular material with provision made for readily altering the device to measure a full range of volumes.

A base of the present device supports a hopper for charging with the granular material to be dispensed. A discharge tube is carried by the base and defines a laterally directed opening through which the material passes during a measuring operation. A slidably mounted control tube normally closes the discharge tube opening and defines a laterally directed opening which, upon tube elevation, is brought into register with the discharge tube opening for passage of the material into the control tube interior. A remaining tube, termed a measuring tube, is removably seated within the control tube with the combined effective volumes of the control tube and measuring tube determining the measured amount of material. Means are provided to enable convenient substitution of a measuring tube from an array of tubes of various lengths to attain the volume desired.

During a measuring operation the lowermost or outlet end of the measuring tube is closed in a temporary manner desirably by a receptacle into which the measured charge is to be deposited.

Means are provided for fine adjustment of the extended relationship of the control and measuring tubes for precise volume control. Tube internal structure precludes the formation of voids which are adverse to uniform measuring.

Important objects of the present invention include the provision of a volumetric measure for particulate material which measures in a highly precise manner to assure uniformity of measured amounts; the provision of a measure which is highly adaptable to discharging any desired amount commonly used by those engaged in reloading of shotgun shells or cartridge cases; the provision of a measure having adjustable components which, when adjusted, may be locked in place to preclude weighing of later discharged amounts to verify volumetric accuracy; the provision of a measure incorporating an elastomeric ring which serves to couple telescoped tubes of the device; the provision of a measure which avoids the grinding of gunpowder particles which grinding would have an adverse effect on the burning rate of the measured charge; the provision of a measure which avoids shearing of a particle which would induce vibration into the device to adversely affect the uniform density of the material being measured; the provision of a measure in which the measured material must follow an irregular path into the measuring chamber to avoid packing of the material; the provision of a measure which does not require a stationary support.

BRIEF DESCRIPTION OF THE DRAWING

In the accompanying drawing:

FIG. 1 is a side elevational view of the present measuring device with fragments broken away for purposes of illustration;

FIG. 2 is an enlarged side elevational of the removed control tube and the measuring tube with fragments broken away and with the stationary discharge tube shown in phantom lines;

FIG. 3 is a side elevational view of an array of measuring tubes each being of a different length; and FIG. 4 is an elevational view taken along line 4—4 of FIG. 2.

DETAILED DESCRIPTION OF THE PREFERRED EMBODIMENT

With continuing attention to the drawing wherein applied reference numerals indicate parts similarly hereinafter identified, reference numeral 1 indicates a base of the present device having a circular upper portion 2 and a downward tapering conical portion 3.

The base includes a mounting arm 4 which is bifurcated at 5 for inserted engagement beneath the head of a fastener 6 permanently seated in a support 7. An upwardly projecting rim 8 of the base partially defines a base annular shoulder 9 which serves to receive the lower end 10A of a hopper 10. A hopper lid at 11 is removable to permit convenient refilling of same.

A base cavity is defined by a conical surface 12. Fixed in place within a base bore 13 is a discharge tube 14. Said tube defines a lateral opening 15 located to receive the material to be discharged in measured fashion. Confined within the tube upper end segment is a helical compression spring 16 the upper end of which abuts discharge tube upper end 17.

Slidably housed within the lower end of discharge tube 14 is a control tube 20. Axial movement of control tube 20 is limited by a C-shaped fitting 21 having inwardly turned ends passing through aligned apertures in discharge tube 14 and opposed elongate slots 23 formed in said control tube. Accordingly, fitting 21 serves to support tube 20 at its lower extreme of travel while compressed spring 16 limits tube upward travel. As best shown in FIG. 2, control tube 20 also has a laterally directed opening 24 which, upon elevation of tube 20, comes into register with discharge tube opening 15 to admit material into tube 20.

A plug 25 is located adjacent opening 24 and has an inclined lower surface 26 against which a portion of the particulate material may momentarily rest upon at the completion of tube filling. The downwardly inclined surface 26 prevents bridging and the formation of voids in the material which would prevent uniformity of the measured amounts. Plug 25 is fixed in place by a suitable adhesive.

With continuing attention to control tube 20, the same terminates downwardly in a flange 27. An opening at 30 in the tube wall is formed by a chordal slot which receives an elastomeric ring 31 a segment of the internal periphery of which is disposed in said slot for frictional engagement with yet another tube component as described below.

A remaining tubular member at 32 is termed a measuring tube in view of its primary function being to determine the volume of the measured amount. It is to be remembered that control tube 20 will also momentarily receive a portion of the measured amount in an area above the upper extremity 32A of measuring tube 32. Movable receiving means shown as a hand held powder pan 36 serves both to close tube end 32B and to impart lifting movement to tubes 32 and 20 during measuring of a charge. Measuring tube 32 includes a flange 33 drilled and tapped to receive a fine adjustment screw 34 the uppermost end of which abuts the underside of control tube flange 27. Accordingly, the inserted or telescoped relationship of tube 32 to tube 20 may be finely varied to control the effective combined volume of tubes 20 and 32. As shown in FIG. 2, advancement of adjustment screw 34 will result in downward positioning of measuring tube 32 and vice versa. Screw 34 may be secured to flange 33 by a drop of adhesive as at 35. Elastomeric ring 31 frictionally engages measuring tube 32 to prevent undesired movement relative to tube 20.

In the series of measuring tubes shown in FIG. 3, parts corresponding to those of tube 32 are identified with corresponding prime reference numerals. The tubes' overall length will increase in increments a dimension approximately equal to the effective travel of the fine adjustment screw to provide for measuring any volume within a range applicable to whatever measuring task is at hand.

In one embodiment of the present measure thin wall brass tubing is used with the tube diameters being such that the tubes are in net sliding clearance with adjacent tube surfaces. The ring 31 may be that type of ring commonly termed an O-ring.

To prevent shearing of powder granules by an upper edge 24A of control tube opening 24 as said edge approaches a lower edge 15A of tube 14, spring 16 is of a size and rate as to only lightly bias control tube 20 at its lower limit of travel and accordingly should a granule or granules G be caught between said edges, as per FIG. 4, the same will not be sheared. Shearing of granules is, as earlier noted, undesirable by reason of vibration induced in the measure, such effecting a settling of the particulate material and hence density changes in the hopper stored material.

The present measure is particularly suited for measuring gunpowder in a precise manner in that the material must follow an irregular or S-shaped path into the control and measuring tubes which avoids over or under packing of the material into the tube defined measuring chamber by reason of the head of material in the hopper. While the foregoing description has been with occasional reference to gunpowder, such is not to be construed that its use is in any way restricted to dispensing measured amount of any one material.

While I have shown but one embodiment of the invention it will be apparent to those skilled in the art that the invention may be embodied still otherwise without departing from the spirit and scope of the invention.

Having thus described the invention, what is desired to be secured under a Letters Patent is:

1. A device for dispensing a desired quantity of particulate material in combination with movable receiving means, said device comprising,
   a base,
   a hopper on said base to store a quantity of material,
   a discharge tube in place on said base and extending into said hopper and defining an intake opening intermediate its ends for the intake of hopper stored material,
   a control tube slidably carried by said discharge tube and normally closing said intake opening therein, said control tube defining an intake opening normally out of register with the discharge tube intake opening, axial movement of said control tube serving to communicate the intake openings in the tubes,
   a measuring tube telescopically engaged with and depending from said control tube, means regulating the extent of telescopic engagement of said measuring tube with said control tube,
   said movable receiving means adapted for closing and opening the lowermost end of the measuring tube and for imparting axial movement to the control and measuring tubes for the filling of same, and
   the combined effective volume of said control tube and said measuring tube determining the volume of measured material for subsequent discharge.

2. The device claimed in claim 1 additionally including means coupling said control tube and said measuring tube in a detachable manner.

3. The device claimed in claim 2 wherein said coupling means is an elastomeric ring.

4. The device claimed in claim 3 wherein said control tube has a chordal slot receiving a segment of said ring.

5. The device claimed in claim 1, 2, 3 or 4 wherein said control tube includes plug means having a downwardly inclined surface preventing the bridging of material in the control tube.

6. The device claimed in claim 5 wherein said downwardly inclined surface of said plug means is offset inwardly from the control tube opening.

7. The device claimed in claim 6 additionally including a helical compression spring acting on said control tube to bias the same downwardly toward a position closing the discharge tube opening.

8. The device claimed in claim 7 wherein said spring is substantially fully expanded at the extreme of control tube travel in one direction to avoid shearing of particulate material.

* * * * *